May 12, 1925.
G. M. MAXWELL
ATTACHMENT FOR HEAD MIRRORS
Filed Nov. 21, 1923
1,537,922
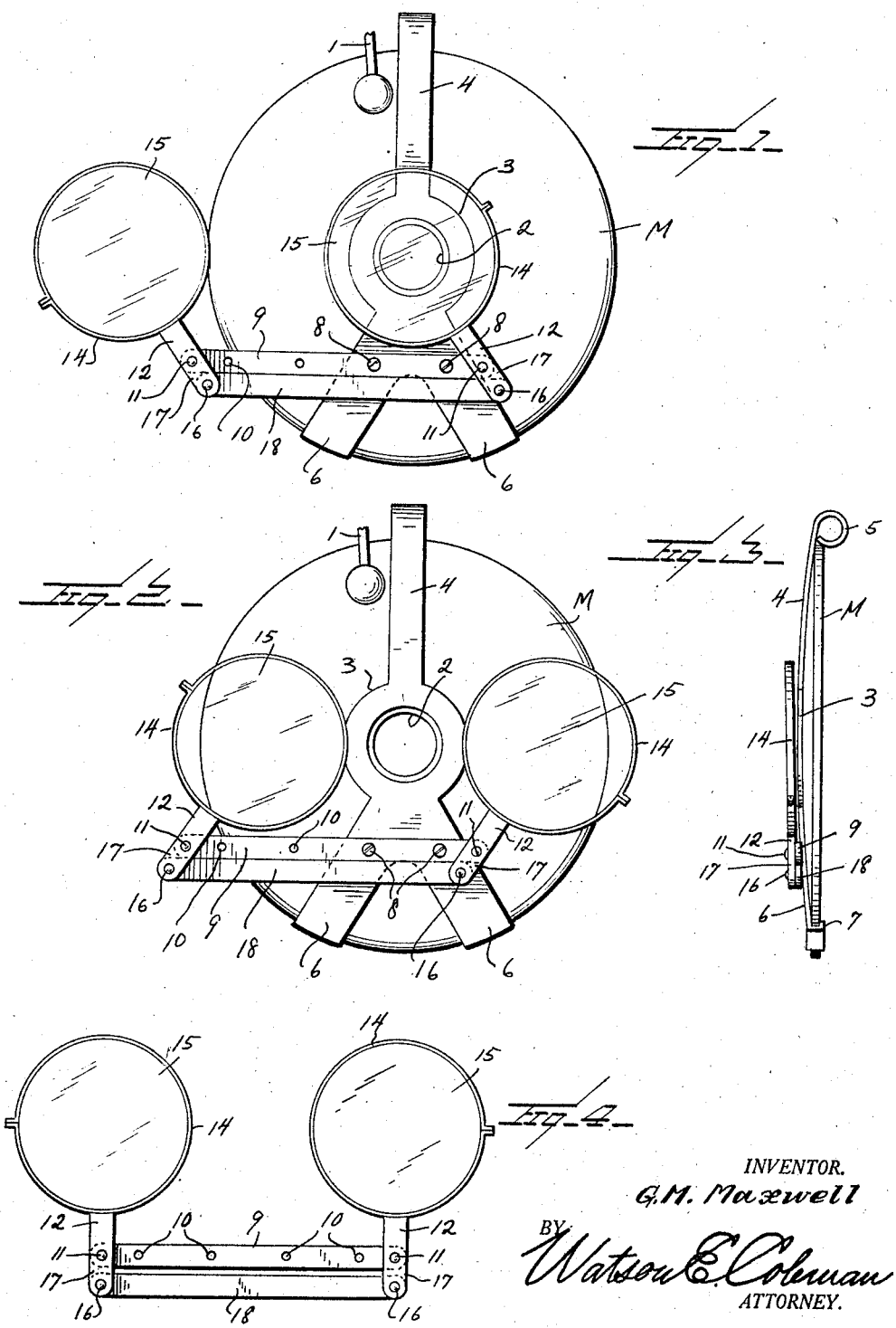
INVENTOR.
G. M. Maxwell
BY
Watson E. Coleman
ATTORNEY.

Patented May 12, 1925.

1,537,922

UNITED STATES PATENT OFFICE.

GEORGE M. MAXWELL, OF ROANOKE, VIRGINIA.

ATTACHMENT FOR HEAD MIRRORS.

Application filed November 21, 1923. Serial No. 676,086.

*To all whom it may concern:*

Be it known that I, GEORGE M. MAXWELL, a citizen of the United States, residing at Roanoke, in the county of Roanoke and State of Virginia, have invented certain new and useful Improvements in Attachments for Head Mirrors, of which the following is a specification, reference being had to the accompanying drawings.

This invention relates to certain improvements in attachments for head mirrors and it is an object of the invention to provide a novel and improved attachment of this general character which, when in applied position, permits binocular vision through lenses of desired value.

It is also an object of the invention to provide a novel and improved attachment of this general character which may be readily and conveniently applied to or removed from the mirror proper and which attachment includes a pair of lenses of desired value, said lenses when not in use being movable into position substantially overlying the mirror, one of said lenses when in working or operative position overlying the peep opening in the mirror and the second of said lenses being positioned to one side of the mirror whereby binocular vision is permitted the user to facilitate the proper gauging of surgical instruments or the like for distance.

The invention consists in the details of construction and in the combination and arrangement of the several parts of my improved attachment for head mirrors whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is an elevational view of an attachment constructed in accordance with an embodiment of my invention and in applied position, the lenses being arranged in working or operative position;

Figure 2 is a view similar to Figure 1 with the lenses moved into inoperative position;

Figure 3 is a view in end elevation of the structure as illustrated in Figure 2;

Figure 4 is an elevational view of the lenses and the supporting means therefor unapplied.

As disclosed in the accompanying drawings, M denotes a head mirror of a conventional or well-known type and which is adapted to have associated therewith in a well-known manner means engageable with the head for holding said mirror in proper position with respect to the eyes of the user, said means being fragmentarily indicated at 1. The mirror M at its axial center is provided, as is well-known, with a peep opening 2.

My improved attachment comprises a substantially central annular member 3 of desired size but having its mean diameter in excess of the diameter of the peep opening 2 so that said member 3 may be disposed, when the attachment is in applied position, around said opening 2 without offering any obstruction thereto as is clearly illustrated in Figures 1 and 2 of the accompanying drawings.

Extending radially from the member 3 is an elongated arm 4 possessing a certain degree of inherent resiliency and which terminates in a returned portion 5 which provides a catch adapted to swing over and frictionally engage the periphery of the mirror M for maintaining the attachment in applied position yet readily permitting said attachment to be removed when desired.

The member 3 at a point substantially diametrically opposed to the arm 4 is provided with a pair of diverging arms 6, each terminating in a reverted flange 7 adapted to receive a peripheral portion of the mirror M. Through the instrumentality of the arms 4 and 6 the attachment has three points of contact with the periphery of the mirror M and in a manner whereby the mirror is effectively maintained in applied position upon the mirror. The attachment M when applied overlies the rear or convex face of the mirror.

Secured to the inner portions of the arms 6 by the screws 8 or the like is an end portion of an arm 9, said arm being substantially perpendicularly related to the arm 4 and of a length to terminate to one side of the mirror M. The screws 8 or the like are selectively disposed through the openings 10 in the arm 9, said openings being spaced longitudinally of said arm 9. By this means the arm 9 may be readily fixed to the arm 6 to project beyond either side of the mirror M in accordance with the requirements of practice or more particularly in the event the physician or the like uses the right or left eye for gazing through the peep hole 2.

Pivotally engaged, as at 11, with the opposite end portions of the arm 9 are the stems 12 arranged in parallelism and which are provided at their inner or upper ends with the holders or rims 14 for the lenses 15, said lenses being of desired value. The stems 12 extend beyond the side of the arm 9 remote from the holders or rims 14 and pivotally engaged, as at 16, with the extremities of such extensions 17 is a rigid bar or link 18 whereby the stems 12 are caused to swing in unison and in the same direction and at all times maintained in parallelism.

The arm 9 and the arm or link 18 are of such lengths that when the stems 12 are swung in one direction, as illustrated in Figure 1, one of the lenses 15 will be caused to overlie the peep opening 2 while the second lens 15 will be positioned to one side of the mirror M. By this means the user is permitted to have binocular vision and this is of particular importance as it permits both eyes to be employed and thereby enabling the proper gauging of distances when the device is in use. This is of special importance when performing operations relative to the ear, mouth or other external orifices of the body or operations of other characters.

When the stems 12 are swung in the opposite direction the lenses 15 substantially overlie the mirror M at opposite sides of the peep opening 2 and offer no obstruction to said opening 2 in the event it is desired to use such opening independently of a lens.

As is clearly indicated in Figures 1 and 2 it is to be noted that the limit of movement of the stems 12 in either direction is effected by contact of the arm or link 18 with the arm 9.

From the foregoing description it is thought to be obvious that an attachment for head mirrors constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a head mirror provided with a peep opening, an attachment provided with means for detachably securing the same to the mirror, a pair of lenses movably supported by the attachment, one of said lenses when in one position being disposed over the peep opening and the second lens being positioned to one side of the mirror, said lenses when in such positions permitting binocular vision.

2. In combination with a head mirror provided with a peep opening, an attachment provided with means for detachably securing the same to the mirror, a pair of lenses movably supported by the attachment, one of said lenses when in one position being disposed over the peep opening and the second lens when in one position being positioned to one side of the mirror, said lenses when in such positions permitting binocular vision, and means for limiting the movement of the lenses to such positions.

3. In combination with a head mirror provided with a peep opening, an attachment provided with means for detachably securing the same to the mirror, a pair of lenses movably supported by the attachment, one of said lenses when in one position being disposed over the peep opening and the second lens when in one position being positioned to one side of the mirror, said lenses when in such positions permitting binocular vision, said lenses when moved in the oppposite direction being positioned at opposite sides of and free of the peep opening, and means for limiting the movement of the lenses to either position.

4. In combination with a head mirror provided with a peep opening, an attachment provided with means for detachably securing the same to the mirror, a pair of lenses movably supported by the attachment, one of said lenses when in one position being disposed over the peep opening and the second lens being positioned to one side of the mirror, said lenses when in such positions permitting binocular vision, and means to cause said lenses to move in unison and in the same general direction.

5. In combination with a head mirror provided with a peep opening, an attachment therefor comprising an annular member adapted to surround the peep opening, means carried by said annular member for detachably holding the attachment to the mirror, a bar operatively supported by the annular member, stems pivotally connected with the opposite end portions of said bar, lenses carried by the stems, and means connecting said lenses for swinging movement in unison and in the same direction, said stems being so mounted as to cause one of the lenses upon movement of the stems in one direction to overlie the peep opening, and a second lens to be positioned to one side of the mirror.

6. In combination with a head mirror having a peep opening, a member having an opening for registry with the peep opening, means carried by said member for securing the member to the mirror, a bar operatively supported by the member, swinging lenses engaged with the bar, and a second bar operatively engaged with the lenses to cause the same to swing in unison and in the same direction, said second bar coacting with the first named bar for limiting the extent of swinging movement of the lenses in either direction, movement of the lenses in one direction bringing one of said lenses in overlying relation with the peep opening and the second lens to one side of the mirror.

7. As a new article of manufacture, an attachment for a head mirror having a peep opening comprising a member adapted to overlie the back of the mirror and provided with means to detachably hold said member to the mirror, a pair of lenses, means for connecting said lenses with the member for movement from one position to another with respect to the peep opening and to the mirror.

8. As a new article of manufacture, an attachment for a head mirror having a peep opening comprising a member adapted to overlie the back of the mirror and provided with means to detachably hold said member to the mirror, a pair of lenses, means for connecting said lenses with the member for movement from one position to another with respect to the peep opening and to the mirror, and means associated with the lenses for causing such movement to be in unison.

9. As a new article of manufacture, an attachment for a head mirror having a peep opening comprising a member adapted to overlie the back of the mirror and provided with means to detachably hold said member to the mirror, a pair of lenses, means for connecting said lenses with the member for movement from one position to another with respect to the peep opening and to the mirror, and means associated with the lenses for causing such movement to be in unison and in the same general direction.

In testimony whereof I hereunto affix my signature.

GEORGE M. MAXWELL.